Figure 1:
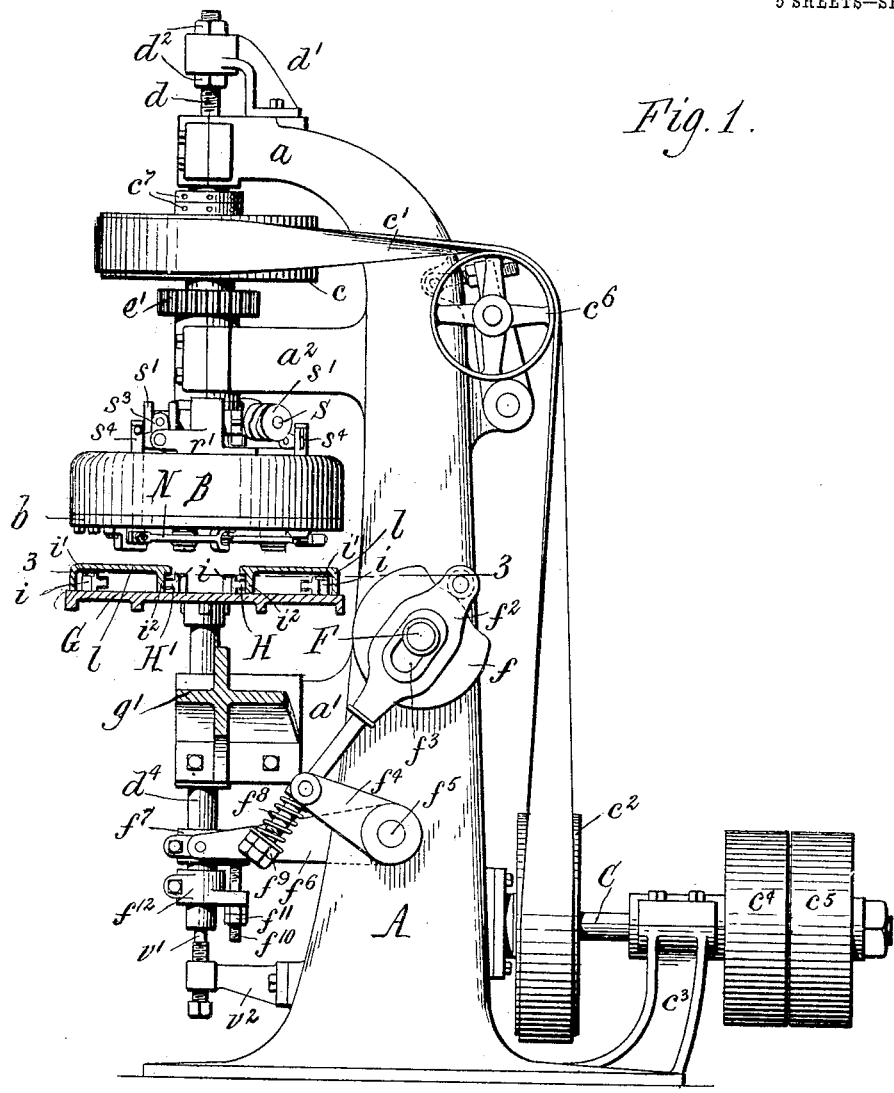

No. 805,736. PATENTED NOV. 28, 1905.
B. J. LINDGREN.
MACHINE FOR HEADING CANS AND BOXES.
APPLICATION FILED MAR. 25, 1905.

5 SHEETS—SHEET 1.

Witnesses:
E. A. Jock.
R. W. Runser

Inventor.
B. J. Lindgren,
by Wilhelm, Parker & Hard
Attorneys.

No. 805,736. PATENTED NOV. 28, 1905.
B. J. LINDGREN.
MACHINE FOR HEADING CANS AND BOXES.
APPLICATION FILED MAR. 25, 1905.

5 SHEETS—SHEET 2.

Witnesses:
E. A. Vock.
R. W. Runser.

Inventor
B. J. Lindgren,
By Wilhelm, Parker & Hard
Attorneys.

No. 805,736. PATENTED NOV. 28, 1905.
B. J. LINDGREN.
MACHINE FOR HEADING CANS AND BOXES.
APPLICATION FILED MAR. 25, 1905.
5 SHEETS—SHEET 3.
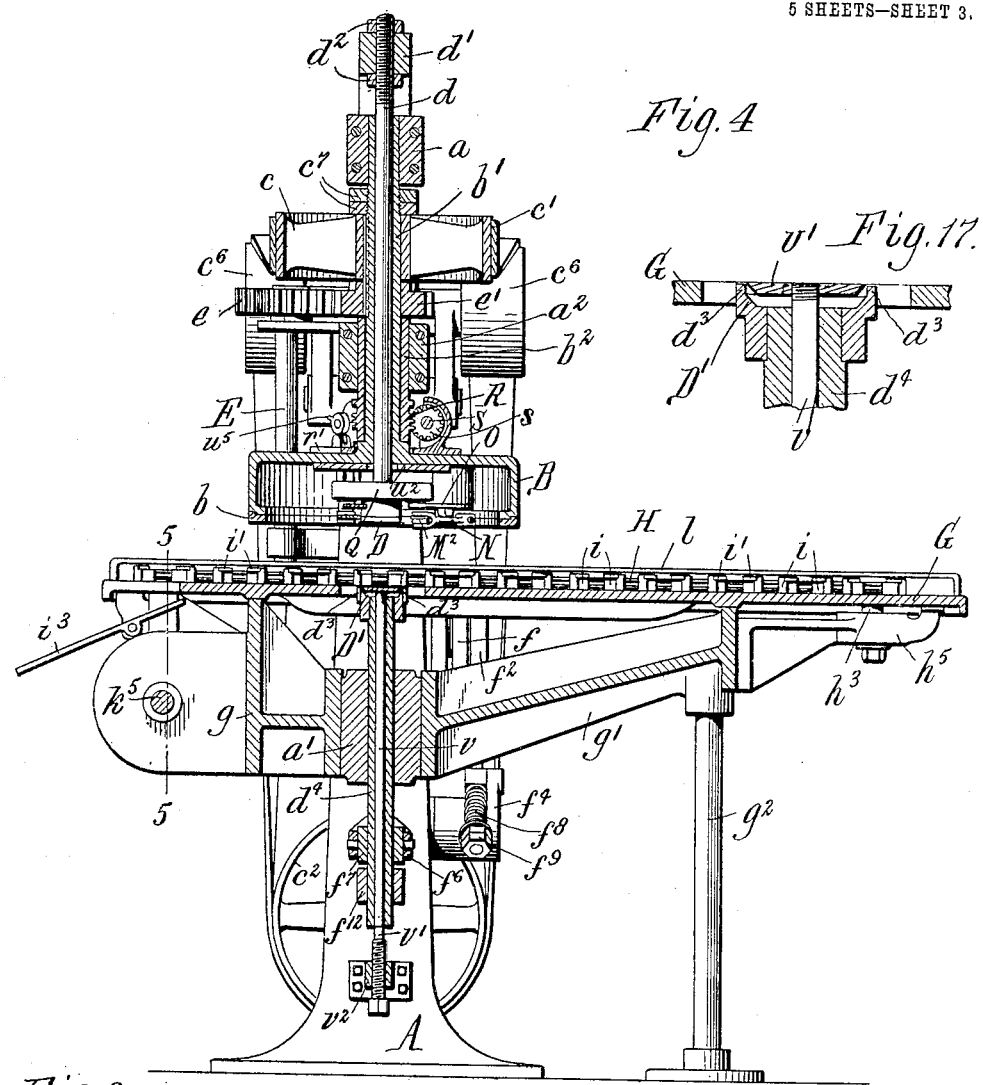
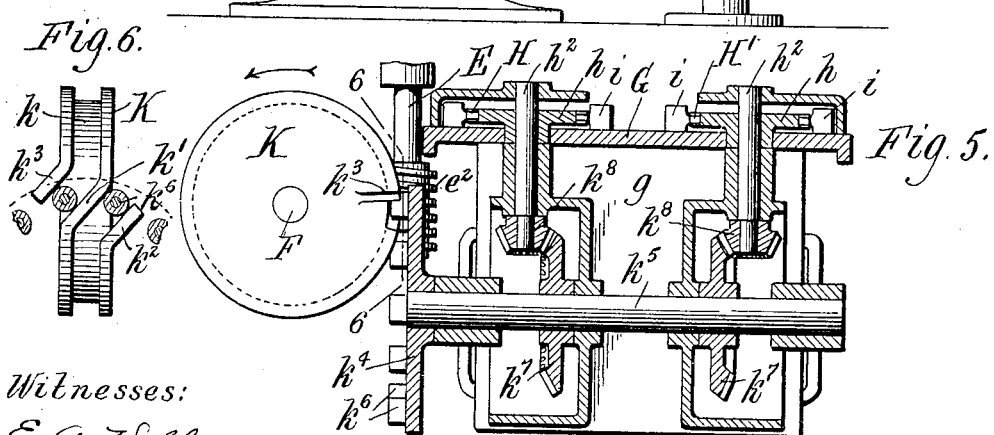
Witnesses:
E. A. Volk.
R. W. Rinser.
B. J. Lindgren, Inventor.
By Wilhelm, Parker & Hand, Attorneys.

No. 805,736. PATENTED NOV. 28, 1905.
B. J. LINDGREN.
MACHINE FOR HEADING CANS AND BOXES.
APPLICATION FILED MAR. 25, 1905.
5 SHEETS—SHEET 4
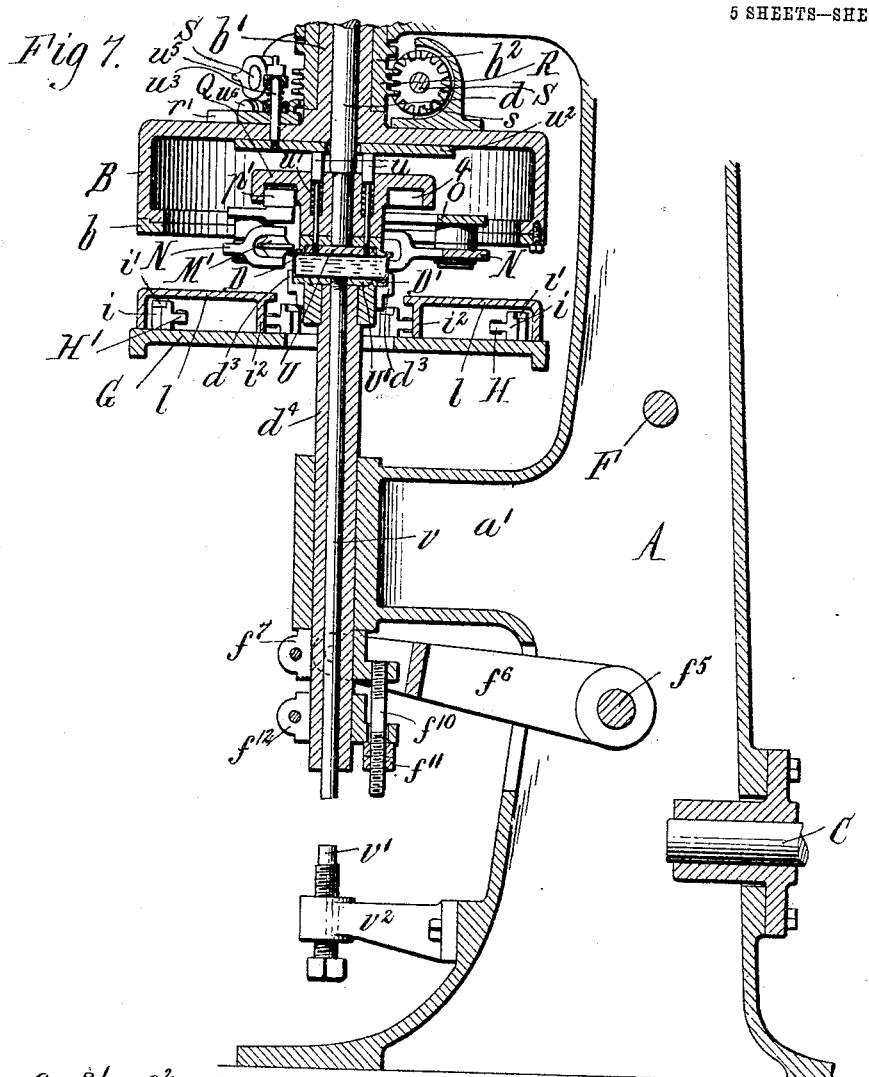
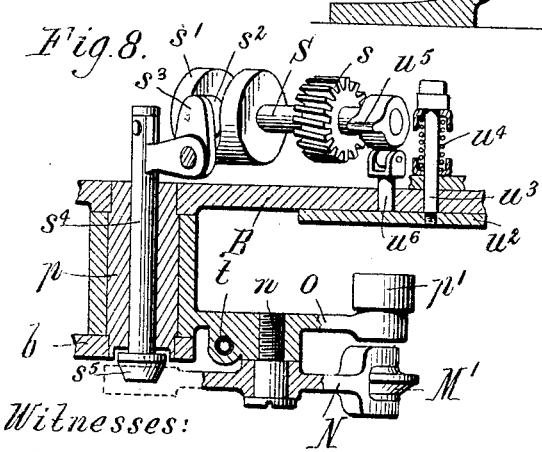
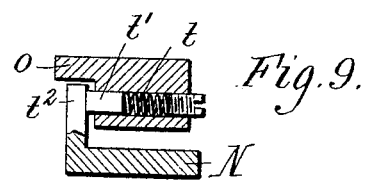
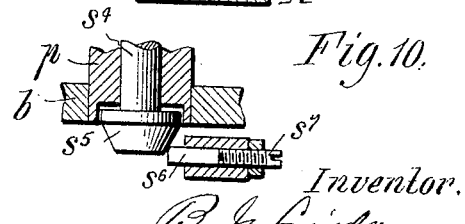

No. 805,736. PATENTED NOV. 28, 1905.
B. J. LINDGREN.
MACHINE FOR HEADING CANS AND BOXES.
APPLICATION FILED MAR. 25, 1905.

5 SHEETS—SHEET 5.

Witnesses:
E. A. Volk.
R. W. Remsen.

Inventor.
B. J. Lindgren,
by Wilhelm Parker Hard
Attorneys.

UNITED STATES PATENT OFFICE.

BROR J. LINDGREN, OF BUFFALO, NEW YORK, ASSIGNOR TO NIAGARA MACHINE & TOOL WORKS, OF BUFFALO, NEW YORK.

MACHINE FOR HEADING CANS AND BOXES.

No. 805,736.      Specification of Letters Patent.      Patented Nov. 28, 1905.

Application filed March 25, 1905. Serial No. 251,968.

*To all whom it may concern:*

Be it known that I, BROR J. LINDGREN, a citizen of the United States, residing at Buffalo, in the county of Erie and State of New York, have invented a new and useful Improvement in Machines for Heading Cans and Boxes, of which the following is a specification.

This invention relates to machines for securing the ends or heads upon cans or boxes of rectangular or other non-circular form, and more particularly to double-seaming machines for securing the cover-heads on filled cans or boxes of the kind in which sardines are packed. Such a machine is herein described, and shown in the drawings; but certain features of the improvements are not limited in application to a double-seaming machine nor to a machine for securing the covers on filled cans, as will be apparent from the following description.

The principal objects of the invention are to produce an efficient desirable automatic machine of maximum capacity for seaming the ends on cans or boxes, especially non-circular cans or boxes; to provide a straightway intermittent feed for the cans which will permit of rapid operation without dislodging the loose heads from the cans or scattering contents of the cans; to so construct the machine that it will produce perfect work and can be operated at high speed with but very little noise and wear on the parts, and to improve the machine in other respects hereinafter pointed out, and set forth in the claims.

Figure 2:
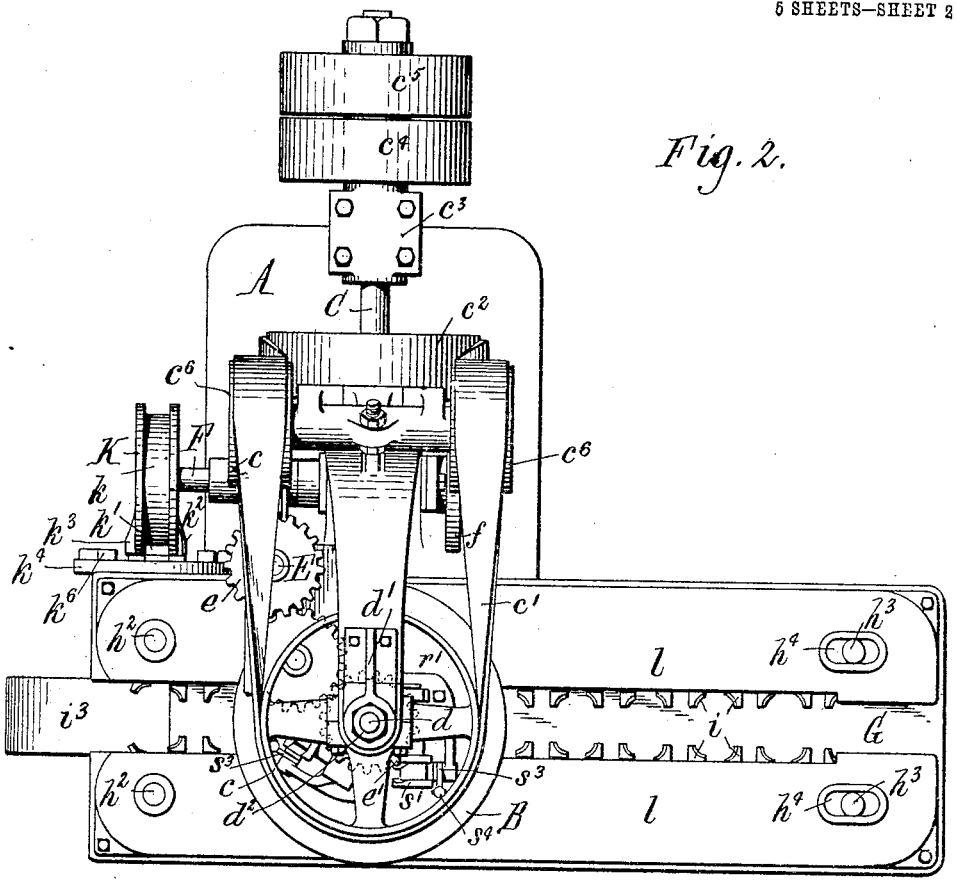
Figure 3:
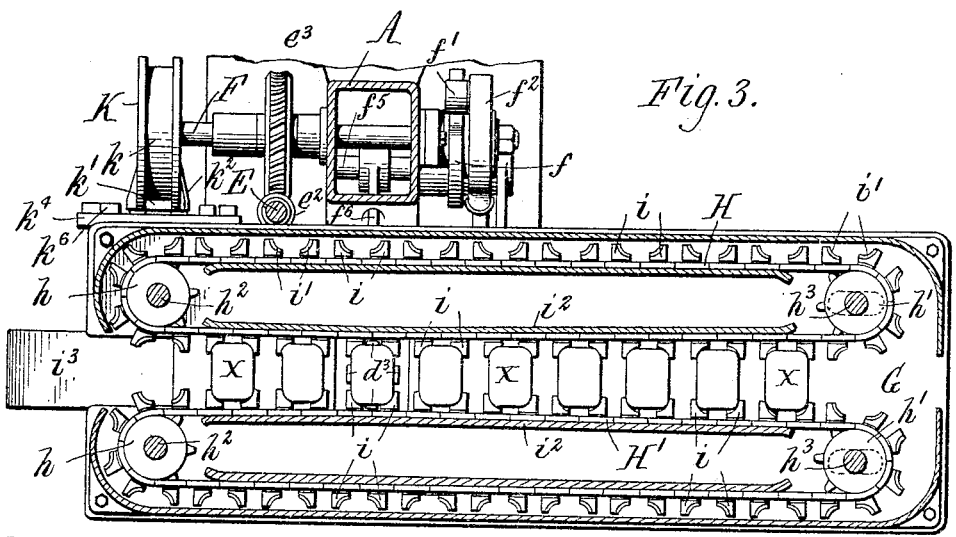
Figure 11:
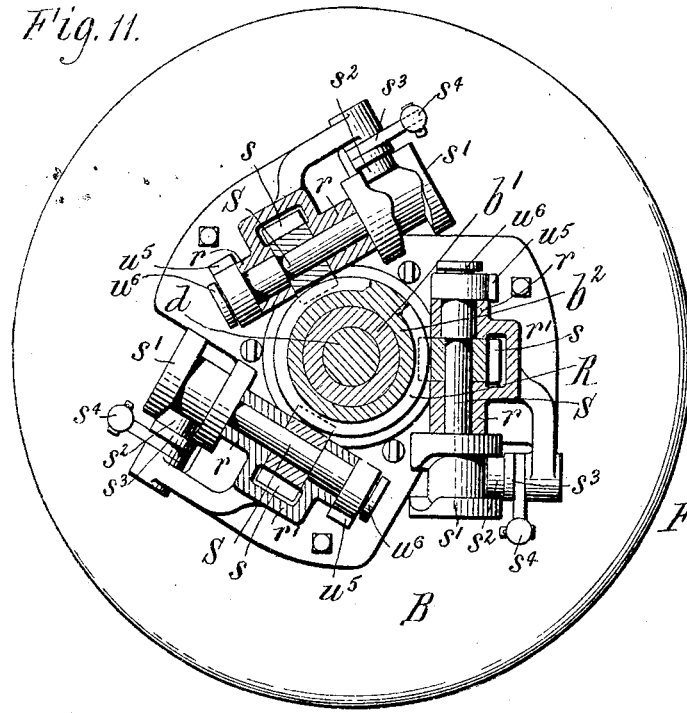
Figure 12:
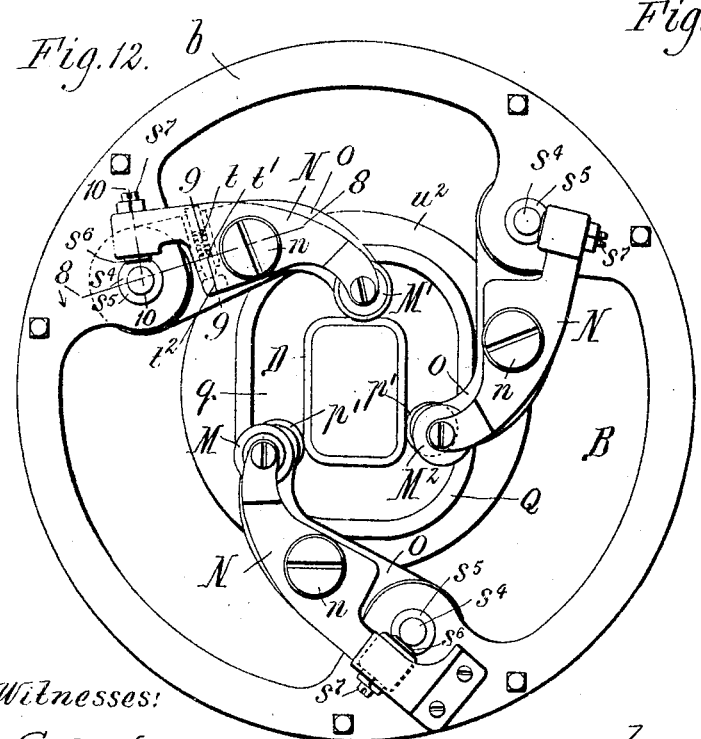
Figure 13:
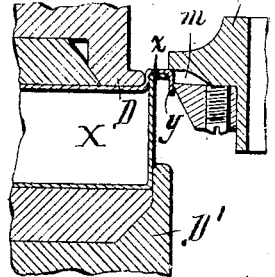

In the accompanying drawings, consisting of five sheets, Figure 1 is a side elevation, partly in section, of a can-heading machine embodying the invention. Fig. 2 is a plan view thereof. Fig. 3 is a horizontal section thereof, partly in plan, in line 3 3, Fig. 1. Fig. 4 is a front elevation, partly in section, thereof. Fig. 5 is a vertical sectional elevation, on an enlarged scale, of the feed-table and feed mechanism in line 5 5, Fig. 4. Fig. 6 is a detail sectional elevation in line 6 6, Fig. 5, of the intermittent drive for the conveyer. Fig. 7 is a fragmentary vertical sectional elevation, on an enlarged scale, of the machine, showing a different position of the parts from that shown in Fig. 4. Fig. 8 is a fragmentary sectional perspective view, on an enlarged scale, of the seaming mechanism substantially in line 8 8, Fig. 12. Fig. 9 is a detail section of the seaming and contour carriers in line 9 9, Fig. 12. Fig. 10 is a detail section of the seaming-carrier and its operating-plunger in line 10 10, Fig. 12. Fig. 11 is a plan view, partly in section, on an enlarged scale, of the seaming-head. Fig. 12 is a bottom plan view, on an enlarged scale, of the seaming-head. Figs. 13, 14, 15, and 16 are enlarged fragmentary sections of the can, can-chuck, and seaming-rolls, illustrating the several steps of the seaming-operator. Fig. 17 is a detail section of the lower chuck-head.

Like letters of reference refer to like parts in the several figures.

Figure 14:
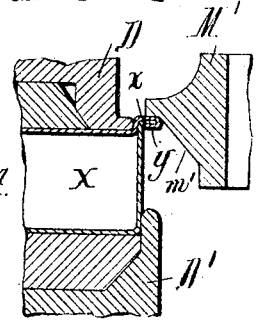
Figure 15:
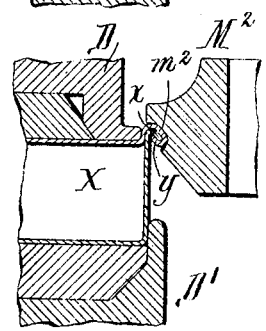
Figure 16:
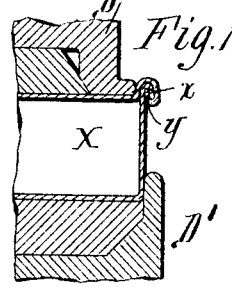

The machine hereinafter described, and shown in the drawings, secures the can end or head to the can by a double seam of the character shown in Figs. 13 to 16, which figures also illustrate the successive steps in the formation of the seam. The can X has an outwardly-projecting top flange $x$, and the end or head has a depressed center, which sits down in the can, and a depending marginal flange $y$, which surrounds the top flange of the can. The flange $y$ of the head is first turned in under the flange $x$ of the can, the interlocked flanges are then bent down at an angle, and finally the seam is pressed in against the wall of the can and completed, as shown in Figs. 14, 15, and 16, respectively.

The machine, briefly stated, is organized and operates as follows: The cans with the ends or heads resting loosely thereon are placed in an intermittently-moving straightway conveyer which at each movement advances a can with its head to a position between the heads of a chuck. While the conveyer is at rest the can and head are elevated and held by the chuck stationarily above the conveyer while the seaming is performed. The seam is produced by a series of suitably-shaped rolls which are journaled on contour and seaming carriers mounted on a continuously-rotating head, during the revolutions of which about the chuck the contour-carriers cause the rolls to travel in a path substantially parallel with the seam while the seaming-carriers present the rolls to and retract them from seaming position in succession, so as to perform the successive steps of the seaming operation. After the last seaming-roll has been retracted the chuck deposits the headed can in the conveyer and the latter moves another step to carry the headed can away from the chuck and present another can and head to the chuck. The machine is continuous in operation and it is only necessary for the operator to place the cans with their loose heads in the conveyer, after which the machine automatically heads and discharges the cans.

A represents the main frame, which may be of any suitable construction, that shown consisting of an upright hollow column or standard provided with forwardly-projecting upper, lower, and intermediate bearing-arms $a$ $a'$ $a^2$ for the can chuck and seaming mechanism.

B represents the revolving head which carries the seaming mechanism. It is preferably a hollow open-bottomed cylinder provided with an inwardly-extending annular bottom flange or ring $b$, bolted or separably secured to the cylinder. The head is secured to or formed on the lower end of vertical hollow shaft $b'$, Figs. 4 and 7, journaled in the upper bearing-arm $a$ of the frame and in a stationary sleeve $b^2$, clamped in the intermediate bearing-arm $a^2$ of the standard. The seaming-head is continuously rotated by suitable drive mechanism. As shown, the seaming-head shaft has fixed to it between the upper and intermediate bearing-arms a belt-pulley $c$, connected by a belt $c'$ with a belt-pulley $c^2$ on a drive-shaft C, Figs. 1 and 2, which is journaled in suitable bearings in the lower part of the standard, and a bearing-post $c^3$, rising from the base of the standard, and is provided with tight and loose drive-pulleys $c^4$ $c^5$. The belt $c'$ runs over ordinary guide-pulleys $c^6$, journaled on the upper portion of the standard and provided with means for adjusting them to properly tension the belt. Any other suitable means for driving the seaming-head can be employed. The seaming-head can be adjusted vertically by nuts $c^7$, screwed on a threaded portion of the hollow shaft $b'$ above the belt-pulley $c$. The latter is held from downward movement by the stationary bearing-sleeve $b^2$ and an interposed gear-wheel, hereinafter referred to, so that the hollow shaft and seaming-head can be raised and lowered by turning the nuts $c^7$.

The chuck for holding the can stationary while the seaming-head revolves around the same to produce the seam comprises upper and lower heads or plates D D'. The upper chuck-head is of a size and shape to properly fit in the depression of the end or cover of the can or box and form a mandrel or internal support for the seam while it is being pressed and will of course differ in machines for operating upon cans of different form and for making different types of seams. The head D shown is of rectangular shape and fits down in the correspondingly-shaped depression of the can end, as shown in Figs. 13 to 16. It is located centrally in the revolving seaming-head and is fixed to the lower end of a stationary vertical rod or shaft $d$, which passes loosely through the hollow shaft of the seaming-head and is secured at its upper end to a bracket $d'$ at the top of the standard, as by nuts $d^2$, screwed on the threaded end of the rod above and below the bracket $d'$. By means of these nuts $d^2$ the chuck-head can be adjusted vertically to the proper position relative to the seaming mechanism. The lower chuck-head D' is shaped to fit and hold the can to be operated upon and is movable toward and from the upper head to grasp and release the can. The lower chuck-head shown is rectangular and is provided on its four sides with upright fingers $d^3$, Fig. 17, between which the can is confined. A can with the end or cover resting loosely thereon is moved to a position over the lower chuck-head while in its lower position by the intermittent feed-conveyer to be hereinafter described, and the lower chuck-head is then raised, carrying the can up and clamping it and its end against the upper chuck-head, where it is held until seamed, when the lower head again lowers and deposits the headed can again in the feed-conveyer. For this purpose the lower chuck-head is fixed to the upper end of a vertical rod $d^4$, which is movable vertically in a guide-hole in the lower bearing-arm $a'$ of the frame and is operated, preferably, by the following mechanism: A vertical counter-shaft E, Figs. 2, 3, and 4, is journaled in suitable bearings at one side of the standard and driven from the hollow shaft of the seaming-head by a suitable train of gear-wheels, one of which, $e$, is secured to the upper end of the shaft E and another, $e'$, of which is the gear before referred to as secured to the hollow shaft of the seaming-head below its drive-pulley. A worm $e^2$, secured to the lower portion of the vertical counter-shaft E, meshes with and drives a worm gear-wheel $e^3$, secured to a horizontal cam-shaft F, which passes through and is journaled in bearings in the standard A. (See Fig. 3.) A cam $f$, secured to one end of this shaft, engages a stud or roller $f'$, projecting from one end of a rod $f^2$, Fig. 1, which is slotted at $f^3$ and slides on the cam-shaft and is connected at its other end to an arm $f^4$, secured to a rock-shaft $f^5$, journaled in the standard. The rock-shaft has another arm $f^6$, the forked end of which is pivotally connected to an adjustable collar $f^7$ on the lower end of the movable chuck-rod $d^4$. A spring $f^8$ is preferably interposed between an adjustable collar or nut $f^9$ on the slide-rod $f^2$ and the rock-arm $f^4$, so that the chuck-rod is moved up with a yielding pressure and is allowed to stop to avoid injury to the machine in the event that the upward movement of the chuck-rod is prevented from any cause. The adjustable collar $f^7$ on the chuck-rod (see Fig. 7) is preferably a split collar clamped on the chuck-rod and connected by an adjusting-screw $f^{10}$ and nuts $f^{11}$ with a second split collar $f^{12}$, clamped on the chuck-rod. This construction enables a more accurate adjustment of the movable chuck-head, as the adjustable collar $f^7$ can be loosened and adjusted minutely on the chuck-rod by the adjusting screw and nuts $f^{10}$ $f^{11}$ and then secured by tightening up the split collar.

G represents a horizontal feed-table along which the cans with the heads resting loosely thereon are fed by an intermittent conveyer to a position between the chuck-heads and again moved away from the chucks after the seaming operation. The table is preferably supported by two brackets $g$ $g'$, which are secured to opposite sides of the lower bearing-arm of the standard and extend laterally in opposite directions therefrom beneath the table. The receiving end of the table, which extends farther out from the standard A, is also preferably steadied by a vertical post $g^2$, provided with a suitable base and secured at its upper end to the outer end of the lateral bracket $g'$.

The intermittent conveyer (see Figs. 3, 4, and 5) consists of two endless chains or belts H H', arranged on top of the table parallel with each other in the same horizontal plane. Each belt or chain passes around two horizontal sprocket-wheels $h$ $h'$, secured to the upright shafts $h^2$ $h^3$, respectively. The shafts $h^2$ of the two conveyer-chains are journaled in suitable bearings in the bracket $g$ and are rotated intermittently in opposite directions, so that the two adjacent or contiguous runs of the conveyer chains or belts move together from the receiving end of the table past the chuck by drive mechanism to be presently described. The shafts $h^3$ of the other sprocket-wheels, which are simply idle wheels, pass through slots $h^4$ in the feed-table and are adjustably secured in any suitable manner to an extension $h^5$ of the lateral supporting-bracket $g'$ for the table. The conveyer chains can be properly tensioned by adjusting the idle sprocket-wheels $h'$. Each conveyer chain or belt is provided with a series of horizontally-projecting lugs or pieces $i$, arranged in pairs in such manner that each pair of lugs on one chain is directly opposite to a pair of lugs on the adjacent run of the other chain, the opposite pairs of lugs on the belts thus forming as they move together along the feed-table a series of pockets or holders to receive the cans or boxes. The lugs $i$ are of a shape to form pockets similar in shape and size to the cans or boxes to be operated upon, those shown forming substantially rectangular pockets and having rabbets or grooves $i'$, Figs. 3 and 7, in their upper portions to receive and hold the flanged can-head. In order to enable the cans, with their covers, to be readily placed in and discharged from the holders of the conveyers and at the same time insure their proper register with the chuck, the adjacent runs of the two conveyer-chains are separated farthest apart at the ends of the table and are caused to converge slightly from the table ends toward the chuck by converging guides $i^2$, rising from the table. The holders are thus expanded sufficiently at the receiving end of the table to readily receive and loosely confine the cans and heads; but as the holders move along toward the chuck they gradually contract until when between the heads of the chuck they register accurately with the latter, so that the lower movable head of the chuck can move up through one of the holders at each rest period of the conveyer and lift its can to the seaming position. As the holders move from the chuck toward the discharge end of the table they again spread or expand somewhat, and when the holder-lugs pass around the sprocket-wheels $h$ for the conveyer-chains they completely free the headed cans and allow them to drop into an inclined discharge-chute $i^3$ at the discharge end of the table.

The feed-conveyer is driven intermittently by any suitable means, the following mechanism being desirable: A wheel K, Figs. 5 and 6, is secured to one end of the cam-shaft F and has a peripheral groove $k$, which is crossed at one point by an oblique rib $k'$ and opens laterally at both edges of the wheel on opposite sides of said oblique rib, forming inlet and outlet openings, adjacent to which the side walls of the groove project obliquely out from the wheel substantially parallel with the rib $k'$, as shown at $k^2$ $k^3$. A wheel $k^4$, arranged at right angles to the grooved wheel K, is secured to one end of a horizontal shaft $k^5$, journaled in bearings in the supporting-bracket $g$ for the feed-table, and has a circular series of studs $k^6$ projecting from its face and adapted to enter the groove of the wheel K. As the grooved wheel K revolves, for instance, to the left, as indicated by the arrow in Fig. 5, the projecting oblique portion $k^2$ of the wall of the groove strikes one of the studs of the wheel $k^4$ and forces it into the inlet-opening and groove $k$, thus giving the wheel $k^4$ a partial turn. The stud-wheel remains stationary, while the stud passes through the straight portion of the groove $k$ and is given a further movement in the same direction, when the oblique rib $k'$ strikes the stud and forces it out of the outlet-opening. A stud $k^6$ enters the inlet-opening as the preceding one passes out of the outlet-opening, so that the wheel $k^4$ and its shaft $k^5$ are intermittently rotated and held stationary between the movements. The shaft $k^5$, carrying the stud-wheel, transmits its motion to the shafts $h^2$ of the conveyer-sprockets, so as to turn the latter in opposite directions, as by oppositely-arranged bevel gear-wheels $k^7$, secured to the shaft $k^5$ and meshing with bevel-gear pinions $k^8$ on the lower ends of the sprocket-shafts. The feed-conveyer chains are preferably covered, except along the center of the feed-table, where the cans are placed in and discharged from the conveyer by plates or shields $l$, Figs. 2 and 5. These plates protect the operatives from injury by contact with the conveyer and also protect the latter from dirt and dust.

The straightway intermittent feed-conveyer described is very efficient in operation. A number of the can-holders are exposed at the receiving end of the feed-table, enabling the operator to place the cans therein with rapidity. The cans and their heads are securely seated in the holder-pockets, and they cannot be dislodged by the movement of the conveyer. The danger of throwing off the loose heads and scattering the contents of the cans is much less in the conveyer described than in a rotary carrier.

M M' M² represent the seaming-rollers, which are carried by the seamer-head and are presented in succession to the work to produce the seam. The seaming-rolls perform successive steps of the seaming operation, and their shape and number will depend upon the form of the seam. For instance, in the machine illustrated, which is intended for forming the double seam before described, one roll M, Fig. 13, has a deep groove $m$ for turning the flange $y$ on the can-head around the projecting flange $x$ on the can, as shown in Fig. 14. A second roll M', Fig. 14, has an inclined or conical face $m'$, which bears against and turns the interlocked flanges down at an angle, as shown in Fig. 15, and a third roll M², Fig. 15, has a shallow peripheral groove $m^2$, which presses the partially-formed seam inwardly, as shown in Fig. 16, thereby completing the seam. Each seaming-roll (see Figs. 8 and 12) is journaled on the inner end of a seaming carrier or lever N, which in turn is fulcrumed between its ends on a pivot-pin $n$, secured to a second lever or contour-carrier O. The contour-carriers are pivoted at their outer ends in the seaming-head, preferably on hollow journals $p$, held in bearing-holes in the top and bottom ring of the seaming-head, and are provided at their inner ends with studs or rollers $p'$, which travel in a cam-groove $q$ in a stationary cam-plate Q, fixed centrally within the seaming-head on the stationary supporting-rod for the upper chuck-head. The cam-groove $q$ conforms substantially to the shape of the can or box to be seamed, so that as the seaming-head revolves around the stationary can in the chuck the seaming-rolls are caused to move in a path substantially parallel with the seam. During the revolutions of this seaming-head each seaming-carrier in succession is oscillated on its contour-carrier to press its roll against the seam, hold it there against the seam for more than a complete revolution of the head about the chuck, and then retract the roll by the following mechanism: R, Figs. 7 and 11, represents a stationary worm which is formed on or secured to the hollow sleeve $b^2$, which loosely surrounds the shaft of the seaming-head and is clamped in the intermediate bearing-arm $a^2$ of the standard A. Arranged around the worm R and journaled in suitable bearings $r$ in a bracket or casting $r'$, secured to the top of the seaming-head, is a series of three seamer-shafts S, one for each seaming-roll. Each shaft is provided with a worm gear-wheel $s$, which meshes with the stationary worm R, so as to cause the rotation of the cam-shafts as the seaming-head revolves. Each seamer-shaft is also provided at one end with a grooved cam $s'$, Fig. 11, into the groove of which extends a stud or roller $s^2$, projecting from one arm of an elbow-lever $s^3$. The elbow-levers are fulcrumed on pins secured in suitable bearing-lugs on the casting $r'$, and the other arm of each lever extends into a slot in the upper end of a vertically-movable plunger $s^4$, of which there is one for each seaming-carrier. Each plunger $s^4$ slides in a vertical axial hole in the journal of the adjacent contour-carrier and is provided at its lower end with a conical head or cam $s^5$, which bears against the outer end of the seaming-carrier. (See Figs. 8, 10, and 12.) The latter is preferably equipped with a block $s^6$ of hardened steel confined in a pocket in the outer end of the seaming-carrier and made adjustable to compensate for wear by a screw $s^7$. The plungers $s^4$ are depressed in the proper sequence to oscillate the seaming-carriers and force the rolls toward the seam by reason of the relative shape and adjustment of their operating-cams. The seaming-carriers are retracted when the plungers are lifted, and their outer ends are held against the conical ends of the plungers by suitable springs. The springs $t$ employed (see Figs. 9 and 12) are confined in pockets in the contour-carriers and press sliding plungers $t'$ in the pockets out against lugs $t^2$, rising from the outer ends of the seaming-carriers. The described worm-gear-operating mechanism for the seaming-rolls is very desirable, as it enables a very high speed of the seaming-head with very little noise and wear, and it is simple, strong, and compact in construction.

The chuck-heads are provided with strippers or plates U U', respectively, for freeing the can from the chuck-heads after the seaming operation. (See Fig. 7.) The stripper-plate U for the stationary chuck-head is located in a cavity in the head and secured to vertical rods $u$, which pass up through holes in the stationary cam-plate Q and have enlarged upper ends which rest on coil-springs $u'$, surrounding the rods in pockets in the cam-plate. These springs retract or hold the stripper-plate normally up in its cavity in the chuck-head. Located in the seaming-head above the stripper-rods $u$ is an annular operating-plate $u^2$, Figs. 7 and 8, provided with vertical rods or stems $u^3$, which pass up through holes in the top of the seaming-head and are yieldingly supported by coil-springs $u^4$, surrounding the rods or stems between nuts or collars at their upper ends and the casting $r'$ on the seaming-head. The operating-plate $u^2$ is depressed to project the stripper-plate downwardly to free the headed can when the movable chuck-head lowers after the seaming operation by tappet-arms $u^5$ on the seamer-shafts, which arms strike rods $u^6$, projecting up from the operating-plate $u^2$ through holes in the seaming-head. The rods $u^6$ are preferably equipped with antifriction-rollers for the tappet-arms to strike against. The tappet-arms $u^5$ revolve with the seaming-head, while the stripper-plate is stationary; but the annular operating-plate $u^2$, which revolves with the seaming-head, is always in position to strike the stripper-rods when depressed, thus enabling the operation of the stripper without requiring such nicety of adjustment as would be necessary without the operating-plate $u^2$.

The stripper-plate U' of the lower chuck-head is provided with a vertical stem or rod $v$, which passes loosely through the lower chuck-rod $d^4$, which is tubular. The stripper-rod $v$ is long enough to project out below the lower end of the chuck-rod, and when the latter nears the end of its downward movement the stripper-rod strikes a stop $v'$ and is arrested, while the chuck-rod completes its movement. Thus the chuck-head is permitted to descend below the plane of the feed-table, while the lower stripper-plate is arrested at the level of the feed-table, as shown in Fig. 17, so that the headed can is freed from the chuck-head and supported in the feed conveyer or pocket at the proper height to be slid off of the stripper-plate by the conveyer. The stripper-head U' remains in this position until the can to be next headed is slid onto the same by the conveyer, and the lower chuck-head rises to elevate the can to seaming position. The stop $v'$ for the lower stripper preferably consists of an adjustable screw passing through a threaded hole in an arm $v^2$, projecting from the lower part of the standard A.

The operation of the machine is as follows: The seaming-head revolves continuously and rapidly. The operative places the cans with the heads or ends resting loosely thereon in the holders of the intermittent conveyer, which advances the cans one after another onto the stripped plate U' of the lower chuck-head D' while the latter is down below the feed-table, as shown in Fig. 17. While the conveyer is at rest, the lower chuck-head is raised by the mechanism described and lifts the can upwardly above the conveyer against the stationary chuck-head D. While the can and its end or head are clamped and held stationary between the heads of the chuck, the seaming is effected by the seaming-rolls acting in succession during the revolutions of the seaming-head B about the chuck, as before explained. Each roll is held against the seam during more than a complete revolution of the seaming-head about the chuck and preferably during two or more revolutions thereof. After all of the seaming-rolls have performed their functions the lower chuck-head descends, lowering the headed can into the pocket of the conveyer from which it was removed. The can is prevented from sticking to the stationary chuck-head and caused to lower with the lower chuck-head by the stripper U of the upper chuck-head. The lower chuck-head descends below the plane of the conveyer, and the stripper U' of the lower head is held up in the same horizontal plane as the feed-table, as before explained, thereby releasing the can from the lower chuck-head. While the can is thus held stationary on the stripper of the lower chuck-head, the intermittent conveyer moves a step, thereby carrying the headed can away from the chuck and moving another can with its loose head onto the stripper-plate of the lower chuck in position to be elevated by the chuck, as before explained. The holders of the intermittent conveyer spread, and as the conveyer-chains pass around the sprocket-wheels at the discharge end of the table the headed cans thus released drop into the inclined discharge-chute.

The intermittent straightway feed-conveyer and its operating mechanism could be combined with seaming mechanisms of different construction; as the action of the conveyer and can-chuck are not dependent on the particular organization of the seaming mechanism, and likewise a different intermittent-feed mechanism could be employed with the seaming mechanism described, and the claims covering the construction of the one mechanism are not limited to the particular construction of the other mechanism. The machine as a whole, however, constructed and organized as described is highly efficient, practical, and desirable.

I claim as my invention—

1. In a seaming-machine, the combination of an intermittently-moving conveyer provided with holders for non-circular cans, a chuck for moving a can out of its conveyer-holder and holding the can and end stationary, a seamer, a carrier for the seamer which revolves around the chuck, and mechanism for imparting to said seamer during its revolutions around the chuck a movement toward the chuck to bring the seamer into action and a movement away from the chuck to bring the seamer out of action, substantially as set forth.

2. In a seaming-machine, the combination of an intermittently-moving conveyer provided with holders for non-circular cans, a chuck for moving a can out of its conveyer-holder and holding the can and end stationary, a seamer which revolves around the chuck, and mechanism for moving said seamer in a path substantially parallel with the seam, and for imparting to said seamer during its revolutions around the chuck a movement toward the chuck to bring the seamer into action and a movement away from the chuck to bring the seamer out of action, substantially as set forth.

3. In a seaming-machine, the combination of an intermittently-moving conveyer provided with non-circular pockets for the cans, a chuck for separately moving the cans out of the pockets and holding the cans and their ends stationary, a seamer, a carrier for the seamer which revolves around the chuck, and mechanism for imparting to said carrier during its revolutions around the chuck a movement toward the chuck to bring the seamer into action and a movement away from the chuck to bring the seamer out of action, substantially as set forth.

4. In a seaming-machine, the combination of a straightway intermittently-moving conveyer provided with holders for non-circular cans, a chuck for moving the cans separately out of the conveyer-holders and holding the cans and their ends stationary, a seamer, a carrier for the seamer which revolves around the chuck, and mechanism for imparting to said carrier during its revolutions around the chuck a movement toward the chuck to bring the seamer into action and a movement away from the chuck to bring the seamer out of action, substantially as set forth.

5. In a seaming-machine, the combination of an intermittently-moving conveyer provided with holders for non-circular cans, a chuck for moving a can out of its conveyer-holder and holding the can and end stationary and then returning the can to its conveyer-holder, a seamer which revolves around the chuck, and mechanism for imparting to said seamer during its revolutions around the can while the same is held stationary by the chuck, a movement toward the chuck to bring the seamer into action and a movement away from the chuck to bring the seamer out of action, substantially as set forth.

6. In a seaming-machine, the combination of an intermittently-moving conveyer provided with holders for the cans, a non-circular chuck for moving the cans separately out of the holders and holding the cans and their ends stationary, a seamer, a carrier for the seamer which revolves about said chuck, and mechanism for imparting to said carrier during its revolutions around the chuck a movement toward the chuck to bring the seamer into action, then a movement parallel with the chuck during more than a complete revolution of the carrier to press the seam, and a movement away from the chuck to bring the seamer out of action, substantially as set forth.

7. In a seaming-machine, a moving conveyer comprising substantially parallel endless carriers provided with complementary parts which form a series of straightway moving pockets between the adjacent runs of said carriers for the cans, and mechanism for moving the cans out of said pockets and seaming them, substantially as set forth.

8. In a seaming-machine, the combination of a moving conveyer comprising opposite endless carriers provided with complementary parts which together form holders for non-circular cans, a chuck for moving a can out of its conveyer-holder and holding the can and end stationary, and mechanism for seaming the can and end while held stationary by said chuck, substantially as set forth.

9. In a seaming-machine, a moving conveyer comprising opposite endless carriers provided with complementary parts which together form a moving pocket for the can, means for contracting said pocket about the can as the pocket moves along, and mechanism for seaming the can, substantially as set forth.

10. In a seaming-machine, the combination of an intermittently-moving conveyer comprising opposite endless carriers provided with complementary parts which together form pockets for the cans, guide means for causing said pocket parts to converge whereby the pockets contract as they move along, a chuck for moving the cans out of the conveyer-pockets and holding the cans stationary, and seaming mechanism which operates upon the cans while they are held stationary by the chuck, substantially as set forth.

11. In a seaming-machine, the combination of a table and an intermittently-moving conveyer comprising opposite endless chains arranged on the table and provided with complementary parts forming pockets between said chains for the cans, a chuck-head above said conveyer, a chuck-head movable vertically through the conveyer-pockets to lift the can against said other chuck-head and hold it stationary, and means for seaming the can while held by said chuck, substantially as set forth.

12. In a seaming-machine, the combination of a conveyer comprising endless carriers provided with parts which form holders for the cans, and means for intermittently driving the conveyer comprising a revolving wheel provided with a straight peripheral groove having adjacent oblique inlet and outlet openings at opposite edges of the wheel, and a wheel connected to the conveyer and provided with a series of studs which are successively engaged and moved through the groove of said first-mentioned wheel, substantially as set forth.

13. In a seaming-machine, the combination of a chuck for holding a non-circular can and its end stationary, a seamer which revolves around said chuck, a carrier for said seamer, and worm-gear mechanism for imparting to said seamer a movement toward the chuck to bring it into action, a movement parallel with the seamer, and a movement away from the chuck to bring the seamer out of action, substantially as set forth.

14. In a seaming-machine, the combination of a non-circular stationary chuck, a seamer which revolves around said chuck, a carrier for said seamer, a stationary worm, and mechanism operated by said worm for imparting to said carrier during its revolutions around the chuck a movement toward the chuck to bring the seamer into action, then a movement parallel with the chuck during more than one complete revolution of the carrier to press the seam, and then a movement away from the chuck to bring the seamer out of action, substantially as set forth.

15. In a seaming-machine, the combination of a non-circular stationary chuck, a seamer which revolves around said chuck, a contour-carrier and a seamer-carrier for said seamer, means for operating said contour-carrier to cause the seamer to travel in a path substantially parallel with the seam to be formed, a stationary worm, and mechanism which revolves around and is operated by said worm for imparting to said seamer-carrier during its revolutions around the chuck a movement toward the chuck to bring the seamer into action and a movement away from the chuck to bring the seamer out of action, substantially as set forth.

16. In a seaming-machine, the combination of a non-circular stationary chuck, a seaming-head which revolves around said chuck, a seamer, a contour-carrier mounted on said head, means for operating said contour-carrier to cause the seamer to travel in a path substantially parallel with the seam to be formed, a seamer-carrier, a stationary worm, a shaft journaled on said seaming-head, a worm-wheel on said shaft meshing with said stationary worm, and connections between said shaft and said seamer-carrier for oscillating the seamer-carrier on said contour-carrier to move the seamer into and out of action during the revolutions of the seaming-head, substantially as set forth.

17. In a seaming-machine, the combination of a non-circular stationary chuck, a seaming-head which revolves around said chuck, a seamer, a contour-carrier mounted on said head, a seamer-carrier pivoted on said contour-carrier, means for operating said contour-carrier to cause the seamer to travel in a path substantially parallel with the seam to be formed, a stationary worm, a shaft journaled on said seaming-head, a worm-wheel secured to said shaft and meshing with said worm, a cam on said shaft, a plunger movable in said head and provided with a cam-face which engages said seamer-carrier, and connections between said cam and said plunger for reciprocating the latter, substantially as set forth.

18. In a seaming-machine, the combination of a non-circular stationary chuck, a stripper for releasing the can from said chuck, a seaming-head which revolves around said chuck, a seamer, mechanism carried by said head for imparting to said seamer during its revolutions around the chuck a movement toward the chuck to bring the seamer into action and a movement away from the chuck to bring the seamer out of action, said mechanism including a part which positively operates said stripper, substantially as set forth.

19. In a seaming-machine, the combination of a non-circular stationary chuck, a stripper for releasing the can from said chuck, a seaming-head which revolves around said chuck, a seamer, a contour-carrier and a seamer-carrier for said seamer, means for operating said contour-carrier to cause the seamer to travel in a path substantially parallel with the seam to be formed, a stationary worm, and mechanism mounted on said seaming-head and operated by said worm for actuating said seamer-carrier and said stripper, substantially as set forth.

20. In a seaming-machine, the combination of a non-circular stationary chuck, a stripper mounted in said chuck and movable relative thereto to release the can, a seaming-head which revolves around said chuck, a contour-carrier mounted on said seaming-head, a seamer-carrier pivoted on said contour-carrier, means for operating said contour-carrier to cause the seamer to travel in a path substantially parallel with the seam to be formed, a stationary worm, a shaft journaled on said seaming-head, a worm-wheel secured to said shaft and meshing with said worm, connections between said shaft and said seamer-carrier for oscillating the seamer-carrier on the contour-carrier, and a device secured to said shaft for operating said stripper, substantially as set forth.

21. In a seaming-machine, the combination of a stationary chuck for holding the can, a stripper which is mounted in said stationary chuck, a seaming-head which revolves around said chuck, mechanism carried by said head for producing the seam, an operating-plate for said stripper which revolves with said seaming-head, and means carried by the head for actuating said plate to move the stripper, substantially as set forth.

22. In a seaming-machine, the combination of a stationary chuck for holding the can, a stripper for releasing the can from the chuck, a seaming-head which revolves around said chuck, mechanism carried by said seaming-head for producing the seam, and an annular plate which revolves with said seaming-head and is movable axially thereof to operate said stripper, and means mounted on the seaming-head for actuating said annular operating-plate, substantially as set forth.

Witness my hand this 21st day of March, 1905.

BROR J. LINDGREN.

Witnesses:
EDWARD C. HARD,
CHAS. W. PARKER.